United States Patent Office 3,299,036
Patented Jan. 17, 1967

3,299,036
NOVEL POLYPEPTIDES AND INTERMEDIATES FOR THE PREPARATION THEREOF
Roger Boissonnas, Bottmingen, and René Huguenin, Reinach, Basel-Land, Switzerland, assignors to Sandoz Ltd. (also known as Sandoz A.G.), Basel, Switzerland
No Drawing. Filed Mar. 31, 1964, Ser. No. 356,026
Claims priority, application Switzerland, Apr. 5, 1963, 4,361/63
7 Claims. (Cl. 260—112.5)

The present invention relates to a hitherto unknown polypeptide and its salts:

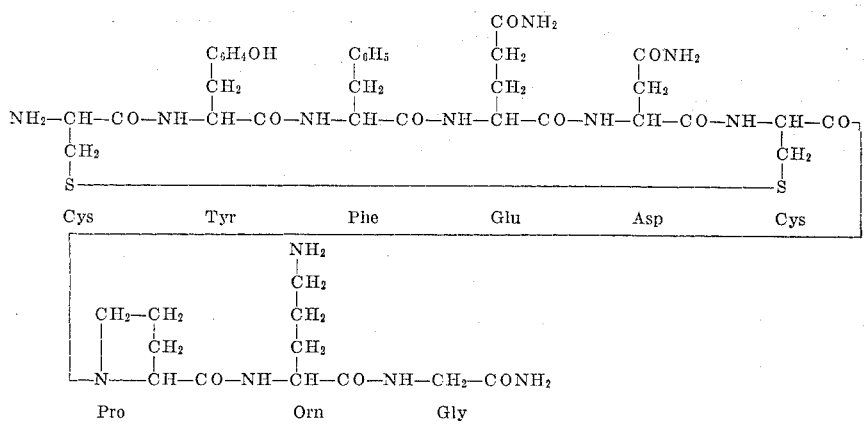

The polypeptide I may be obtained by methods for the synthesis of peptides in actual use or described in the literature on the subject, it being possible to join together the amino acids in the order indicated in the above formula one at a time or by first forming constituent peptide units and joining these together until the polypeptide V (see below) results and oxidising this polypeptide V to form polypeptide I.

One method of producing compound I comprises converting the nonapeptide of Formula V,

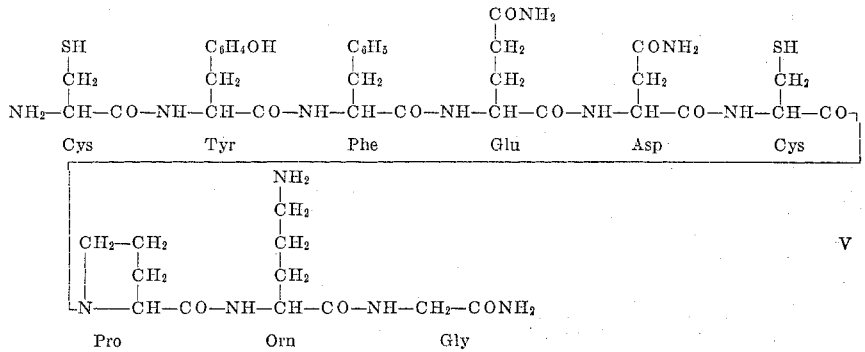

to the compound I by oxidizing compound V in aqueous solution at a pH between 4 and 9 and, when it is desired to produce an acid addition salt, reacting the so obtained compound I with an organic or inorganic acid in a manner known per se. This oxidation is preferably effected by oxidation with oxygen, air or an aqueous hydrogen peroxide solution. Compound V may be obtained by reducing the nonapeptide derivative of Formula IV,

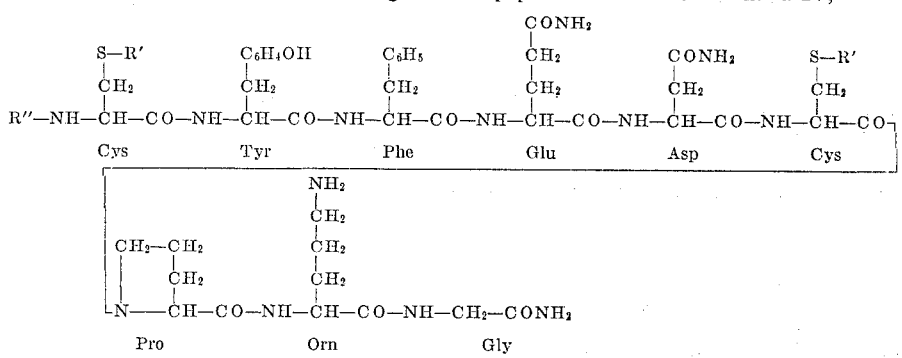

in which:

R′ denotes a radical capable of protecting a sulfhydryl radical in peptide synthesis and
R″ denotes a radical capable of protecting an amino radical in peptide synthesis, with an alkali metal, e.g. sodium or potassium, in liquid ammonia.

Compound IV may be obtained by condensing a hexa-peptide derivative of Formula II,

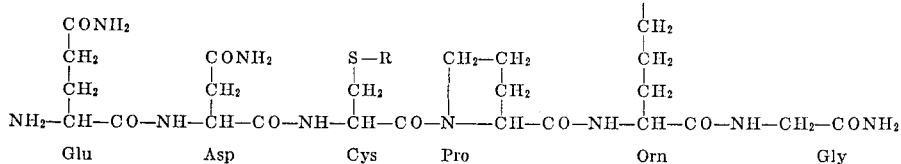

in which R' and R'' have the above significance, with a reactive derivative of a free acid of Formula III,

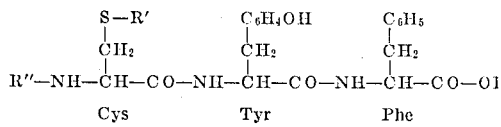

in which R' and R'' have the above significance.

Examples of radicals for protecting the amino radical in the above process by temporarily blocking it are the carbobenzoxy, carbo - p - chloro - benzyloxy, p-toluenesulphonyl and triphenylmethyl radicals, while examples of radicals for protecting the sulfhydryl radical are phenyl, benzyl, p-bromo-benzyl, p-chloro-benzyl, p-nitro-benzyl and p-xylyl radicals.

It has now been found that compound I has a vasoconstrictive effect equal to that of the natural vasopressins from which the new compound differs in that it contains an ornithine radical in the position of the lysine radical (vasopressin from pigs, Formula VIa) or the arginine radical (vasopressin from cattle, Formula VIb), therapy of parenchymatous bleeding, whereby infiltration of the tissues with compound I produces a pronounced ischaemic effect. The properties of compound I are, furthermore, of especial use in surgery of the throat, nose and ear, in gynaecology and obstetrics, in urology and dentistry.

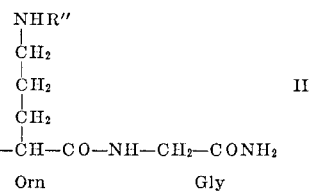

It is suggested that, when compound I is used in an operation under local anaesthesia, it should be administered in admixture with the local anaesthetic, while when it is used in an operation under general narcosis, it should be administered in the form of a dilute physiological sodium chloride solution.

The process of the invention may be carried out, for example, as follows:

N-α-carbobenzoxy-N-δ-p-toluenesulphonyl - L - ornithine is condensed with glycine ethyl ester to give N-α-carbobenzoxy-N-δ-p-toluenesulphonyl - L - onithyl-glycine ethyl ester. After splitting off the carbobenzoxy radical, the resulting N-δ-p-toluenesulphonyl - L - ornithyl-glycine ethyl ester is condensed with N-carbobenzoxy-L-proline to give N-carbobenzoxy-L-prolyl-N-δ-p-toluenesulphonyl-L-ornithyl-glycine ethyl ester, which is converted into the corresponding amide. After splitting off the carbobenz-

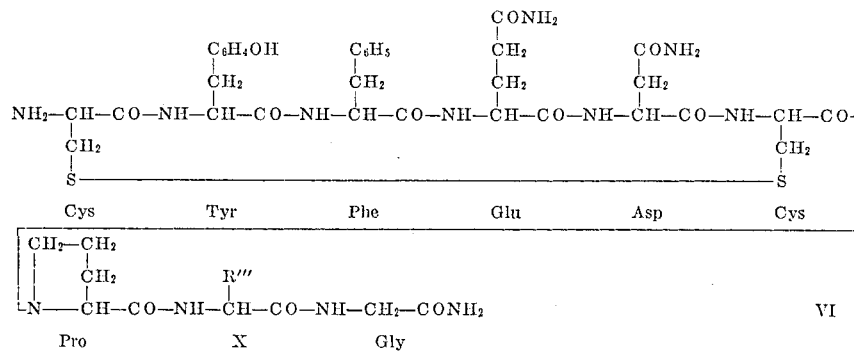

| Formula | R''' | X | Compound |
|---|---|---|---|
| VIa | —CH₂—CH₂—CH₂—CH₂—NH₂ | Lys | lysine-vasopressin. |
| VIb | —CH₂—CH₂—CH₂—NH—C—NH₂<br>‖<br>NH | Arg | arginine-vasopressin. |
| VIc=I | —CH₂—CH₂—CH₂—NH₂ | Orn | Polypeptide of Formula I. |

However, in comparison with the natural vasopressins, compound I has no antidiuretic action and is thus suggested for use in therapy as a substance having a specific vasoconstrictive effect. This specific vasoconstrictive effect of compound I results from a direct influence on the vascular muscles; for this reason no appreciable side effects on the vegetative nervous system are produced, as is the case with adrenalin and noradrenalin. The selective vasoconstrictive effect of compound I could not be foreseen as the structure of the ornithine radical resembles the arginine radical and closely resembles the lysine radical and it was thus to be expected that the properties of the new compound I would not differ appreciably from those of the two natural hormones. The properties of compound I are especially useful in the prophylaxis and oxy radical, the resulting L-propyl-N-δ-p-toluenesulphonyl-L-ornithyl-glycinamide is condensed with N-carbobenzoxy-L-glutaminyl-L-asparaginyl-S-benzyl-L-cysteine azide to give N-carbobenzoxy - L - glutaminyl-L-asparaginyl-S-benzyl - L - cysteinyl-L-propyl-N-δ-p-toluenesulphonyl-L-ornithyl-glycinamide. After splitting off the carbobenzoxy radical, the resulting L-glutaminyl-L-asparaginyl-S-benzyl - L - cysteinyl-L-prolyl-N-δ-p-toluenesulphonyl-L-ornithyl-glycinamide is condensed with N-carbobenzoxy-S-benzyl-L-cysteinyl-L-tyrosyl-L-phenylalanine azide to give N-carbobenzoxy - S - benzyl-L-cysteinyl-L-tyrosyl-L-phenylalanyl - L - glutaminyl-L-asparaginyl-S-benzyl-L-cysteinyl - L - proyly-N-δ-p-toluenesulphonyl-L-ornithyl-glycinamide. This nonapeptide derivative is treated with an alkali metal, preferably sodium or potassium in liquid ammonia, so that the linear nonapeptide V results. This is converted by oxidation, preferably with air, oxygen or hydrogen peroxide in aqueous solution, into the biologically active, cyclic polypeptide I.

The hitherto unknown polypeptide I may be used as free base or as the salt of an organic or inorganic acid, either as pharmaceutical on its own or in the form of appropriate medicinal preparations for administration, e.g. parenterally, enterally or intranasally. Examples of acids for forming acid addition salts are hydrochloric, hydrobromic, sulphuric, fumaric, maleic, malic, acetic and tartaric acid. In order to produce such medicinal preparations, the compounds of the invention are worked up with organic or inorganic adjuvants which are inert and physiologically acceptable. Examples of such adjuvants are as follows:

Tablets and dragees: lactose, starch, talc and stearic acid.
Syrups: solutions of cane sugar, invert sugar and glucose.
Injectable solutions: water, alcohols, glycerin and vegetable oils.
Suppositories: natural or hardened oils and waxes.

The preparations may furthermore contain suitable preserving, stabilizing or wetting agents, solubilizers, sweetening and colouring substances or flavourings.

The present invention also includes pharmaceutical compositions containing, in addition to a physiologically acceptable carrier, the compound I and/or an acid addition salt thereof.

It should be noted that compound V above, together with its acid addition salts and compounds II above, and also the free hexapeptide II (and its acid addition salts) wherein R' and R" each represent a hydrogen atom, are included in the present invention as well as compounds IV above.

Examples of acids suitable for salt formation with compounds I and V and L-glutaminyl-L-asparaginyl-L-cysteinyl-L-prolyl-L-ornithyl-glycinamide are hydrochloric, hydrobromic, sulphuric, citric, tartaric, succinic, maleic, malic, acetic, benzoic, hexahydrobenzoic, methanesulphonic, fumaric, gallic, and hydriodic acid.

In the following examples all temperatures are indicated in degees centigrade.

EXAMPLE 1

(a) *N-α-carbobenzoxy-N-δ-p-toluenesulphonyl-L-ornithyl-glycine ethyl ester*

104 g. of N-α-carbobenzoxy-N-δ-p-toluenesulphonyl-L-ornithine and 27 g. of glycine ethyl ester are dissolved in 450 cc. of acetonitrile, the mixture is cooled at 0°, 51 g. of dicyclohexyl carbodiimide are added and the mixture is shaken at room temperature for 4 hours. Precipitated dicyclohexyl urea is filtered off and washed with acetonitrile. The whole filtrate is evaporated in a vacuum. The residue crystallizes after the addition of petroleum ether. After recrystallization from n-propanol, 93 g. of N-α-carbobenzoxy-N-δ-p-toluenesulphonyl-L-ornithyl-glycine ethyl ester are obtained; melting point 136°; $[\alpha]_D^{22} = -6.5°$ (96% ethanol).

(b) *N-carbobenzoxy-L-prolyl-N-δ-p-toluenesulphonyl-L-ornithyl-glycinamide*

90 g. of N-α-carbobenzoxy-N-δ-p-toluenesulphonyl-L-ornithyl-glycine ethyl ester are dissolved in 800 cc. of anhydrous acetic acid which has been saturated with hydrogen bromide. The mixture is left to stand for one hour at 20°, evaporated in a vacuum at a temperature below 40° and the residue washed carefully with diethyl ether. The residue is dissolved in 500 cc. of acetonitrile, 25 cc. of triethylamine and 43 g. of N-carbobenzoxy-L-proline are added, cooling is effected at 0°, 35.5 g. of dicyclohexyl carbodiimide are then added and the mixture shaken overnight at 20°. After filtering off dicyclohexyl urea, the filtrate is evaporated in a vacuum at 30°, the residue dissolved in ethyl acetate and this solution is washed with dilute sulphuric acid and aqueous ammonia. After drying over sodium sulphate, the ethyl acetate is removed by evaporation in a vacuum and the residue dissolved in 1 litre of absolute ethanol. The solution is cooled at 0°, saturated with ammonia and left to stand overnight at 20°. After evaporating in a vacuum at 30°, the residue is recrystallized from dimethylformamide/ethyl acetate. 58 g. of N-carbobenzoxy-L-prolyl-N-δ-p-toluenesulphonyl-L-ornithyl-glycinamide are obtained; melting point 122° (with decomposition); $[\alpha]_D^{22} = -46°$ (95% glacial acetic acid).

(c) *N-carbobenzoxy-L-glutaminyl-L-asparaginyl-S-benzyl L - cysteinyl - L - prolyl - N - δ - p - toluenesulphonyl-L-ornithyl-glycinamide*

100 g. of N-carbobenzoxy-L-prolyl-N-δ-p-toluenesulphonyl-L-ornithyl-glycinamide are dissolved in 500 cc. of anhydrous acetic acid which has been saturated with hydrogen bromide, the solution is left to stand for one hour at 20° and is evaporated in a vacuum at a temperature below 40°. The residue is carefully washed with diethyl ether and then added to a solution of 100 g. of N-carbobenzoxy-L-glutaminyl-L-asparaginyl-S-benzyl-L-cysteinyl-azide and 26 cc. of triethylamine in 1000 cc. of dimethylformamide. The mixture is left to stand overnight at 20°, 3000 cc. of ethyl acetate are added thereto, the precipitate is filtered off and washing is effected with ethyl acetate. 105 g. of N-carbobenzoxy-L-glutaminyl-L-asparaginyl-S-benzyl-L-cysteinyl-L-prolyl-N-δ-p-toluenesulphonyl - L - ornithyl-glycinamide are obtained; melting point 193°; $[\alpha]_D^{20} = -38.5°$ (dimethylformamide).

(d) *N - carbobenzoxy - S - benzyl - L - cysteinyl - L - tyrosyl - L - phenyl - alanyl - L - glutaminyl - L - asparaginyl - S - benzyl - L -cysteinyl - L - prolyl - N - δ - p-toluenesulphonyl-L-ornithyl-glycinamide*

50 g. of N-carbobenzoxy-L-glutaminyl-L-asparaginyl-S-benzyl-L-cysteinyl-L-prolyl-N-δ-p-toluenesulphonyl-L - ornithyl-glycinamide are dissolved in 250 cc. of anhydrous acetic acid which has been saturated with hydrogen bromide and the solution is left to stand for one hour at 20°. After evaporating the solvent in a vacuum at a temperature below 40°, the residue is carefully washed with diethyl ether and a solution of 31.5 g. of N-carbobenzoxy-S-benzyl-L-cysteinyl-L-tyrosyl-L-phenylalanine-azide and 7.5 cc. of triethylamine in 250 cc. of dimethylformamide is added thereto. The mixture is left to stand for 2 days at 20°, 1000 cc. of ethyl acetate are subsequently added and the precipitate is washed with ethyl acetate. After drying in a vacuum at 30°, the product is washed with warm methanol. 45 g. of N-carbobenzoxy-S-benzyl-L-cysteinyl-L-tyrosyl-L-phenylalanyl - L - glutaminyl-L-asparaginyl-S-benzyl-L-cysteinyl-L-prolyl-N-δ-p - toluenesulphonyl-L-ornithyl-glycinamide are obtained; melting point 224°; $[\alpha]_D^{21} = -41°$ (dimethylformamide).

(e) *L - cysteinyl-L-tyrosyl-L - phenylalanyl-L-glutaminyl-L-asparaginyl-L-cysteinyl-L-prolyl-L-ornithyl- - glycinamide*

The necessary amount of sodium or potassium metal is added to a solution of 5 g. of N-carbobenzoxy-S-benzyl-L - cysteinyl-L-tyrosyl-L-phenylalanyl-L-glutaminyl - L-asparaginyl-S-benzyl-L-cysteinyl-L-prolyl - N - δ - p - toluenesulphonyl-L-ornithyl-glycinamide in 1200 cc. of dry liquid ammonia, whilst stirring at the boiling temperature of the solution, to give a stable blue colouration. After the addition of 3 g. of ammonium chloride, the solution is evaporated to dryness. The residue contains L-cysteinyl-L-tyrosyl - L - phenyl - alanyl-L-glutaminyl-L-asparaginyl-L-cysteinyl-L-prolyl-L-ornithyl-glycinamide.

(f) *Polypeptide compound I*

The residue obtained from step (e) above is dissolved in 5 litres of 0.01 N acetic acid and oxidized at a pH value of 6.5–8.0 by introducing air or oxygen for one hour at 0–40°. The solution, which contains the substance I, is brought to a pH value of 4.0–5.0 and after the addition of 50 g. of sodium chloride or 0.64 g. of methanesulphonic acid evaporation to dryness is effected, whereby a dry powder results which keeps well. It may be stored and when used it may be dissolved to give a clear solution. However, the solution may also be used as such, if desired after diluting with water or a salt solution.

In paper chromatography and paper electrophoresis the polypepetide compound I proved to be homogeneous.

EXAMPLE 2

The same procedure as in Example 1 is used, except that final oxidation is effected at 0–40° by the addition of 7.5 cc. of a N solution of hydrogen peroxide in water at a pH value of 4.0–9.0 (instead of oxidation by introducing air or oxygen).

What we claim is:

1. A compound selected from the group consisting of a polypeptide of the formula

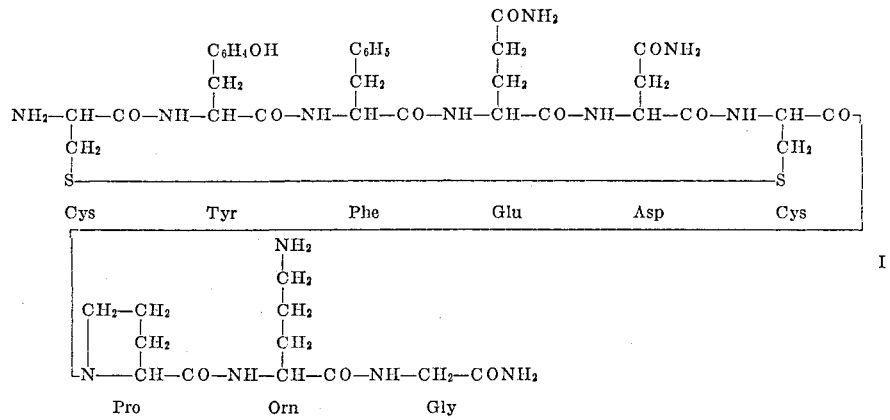

The Rf-value in the increasing chromatogram (butanol/glacial acetic acid/water 70:10:20) is 0.05; ninhydrine-, Folin- and chloro reactions; and (methyl-ethyl-ketone/pyridine/water 65:15:20) 0.12;

and its pharmaceutically acceptable acid addition salts.

2. A compound selected from the group consisting of a polypeptide of the formula

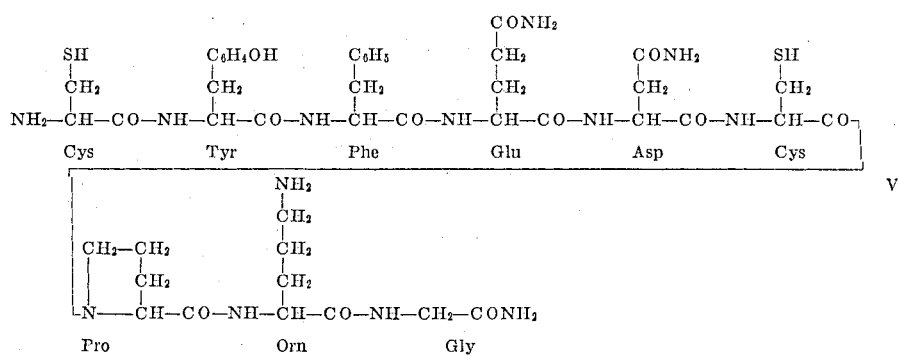

In the high tension electrophoresis on paper the polypeptide I wanders at a pH value of 5.8 (pyridine/acetic acid/water 9:1:90) 7/10 of the distance of histidine $(E^0_{5.8} = 0.7 \text{ His})$ and at a pH of 1.9 (formic acid/acetic acid/water 15:10:75) 9/10 of the distance of tryptophane $(E^0_{1.9} = 0.9 \text{ Try})$ Total hydrolysis with 6 N hydrochloric acid for 16 hours at 110° C. and absence of air yields the expected amino acids in the right ratio.

and its pharmaceutically acceptable acid addition salts.

3. A polypeptide of the Formula IV

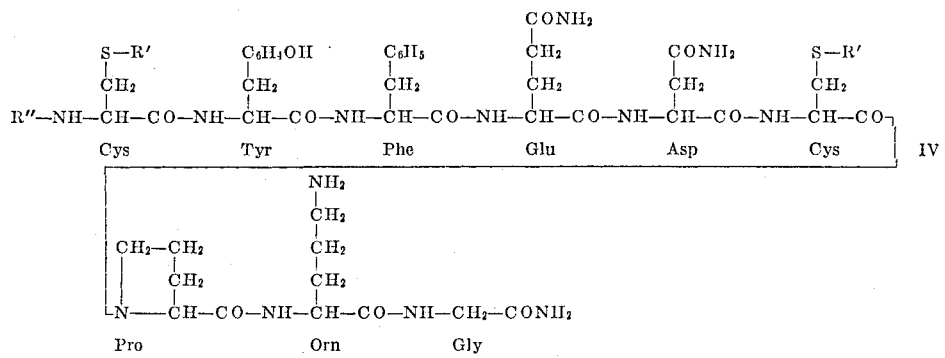

wherein R' denotes a radical capable of protecting a sulfhydryl radical in peptide synthesis and R" denotes a radical capable of protecting an amino radical in peptide synthesis.

4. A polypeptide of the Formula II

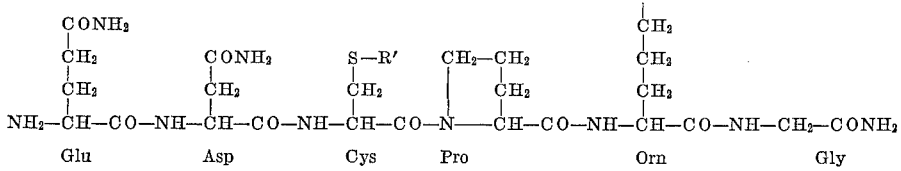

wherein R' denotes a radical capable of protecting a sulfhydryl radical in peptide synthesis and R" denotes a radical capable of protecting an amino radical in peptide synthesis.

5. L - glutaminyl-L-asparaginyl-L-cysteinyl-L-prolyl-L-ornithyl-glycinamide.

6. The compound N - carbobenzoxy-L-glutaminyl-L-asparaginyl - S-benzyl-L-cysteinyl-L-prolyl-N-δ-p-toluene-sulphonyl-L-ornithyl-glycinamide.

7. The compound N - carbobenzoxy - S - benzyl-L-cysteinyl - L-tyrosyl-L-phenyl-alanyl-L-glutaminyl-L-asparaginyl - S - benzyl-L-cysteinyl-L-prolyl-N-δ-p-toluenesulphonyl-L-ornithyl-glycinamide.

References Cited by the Examiner
FOREIGN PATENTS
802,548  10/1958  Great Britain.

LEWIS GOTTS, *Primary Examiner.*

P. A. SMITH, *Assistant Examiner.*